(12) United States Patent
Kaushik et al.

(10) Patent No.: US 8,922,344 B2
(45) Date of Patent: Dec. 30, 2014

(54) DETECTING ROGUE RADIO FREQUENCY BASED TAGS BASED ON LOCATIONING

(71) Applicant: Motorola Solutions, Inc., Schaumburg, IL (US)

(72) Inventors: Anil Kaushik Kaushik, Bangalore (IN); Azif Abdul Salaam, Karnataka (IN); Sanjeev Belambi, Karnataka (IN); Klran Cherian, Karnataka (IN); Rajkiran Klran, Karnataka (IN)

(73) Assignee: Symbol Technologies, Inc., Holtsville, NY (US)

( * ) Notice: Subject to any disclaimer, the term of this patent is extended or adjusted under 35 U.S.C. 154(b) by 148 days.

(21) Appl. No.: 13/659,953

(22) Filed: Oct. 25, 2012

(65) Prior Publication Data

US 2014/0118113 A1    May 1, 2014

(51) Int. Cl.
*G08B 5/22*    (2006.01)
(52) U.S. Cl.
USPC .......................................................... 340/8.1
(58) Field of Classification Search
CPC . H04L 12/1881; H04L 47/15; H04L 47/2475; G06Q 10/087; G06K 7/0008
USPC .................. 340/8.1, 5.61, 7.33, 10.41, 539.2, 340/539.21, 539.13
See application file for complete search history.

(56) References Cited

U.S. PATENT DOCUMENTS

| | | | | |
|---|---|---|---|---|
| 6,232,870 | B1 * | 5/2001 | Garber et al. | 340/10.1 |
| 6,900,762 | B2 * | 5/2005 | Andrews et al. | 342/463 |
| 7,030,731 | B2 * | 4/2006 | Lastinger et al. | 340/10.1 |
| 7,151,445 | B2 * | 12/2006 | Medve et al. | 340/539.15 |
| 7,293,088 | B2 | 11/2007 | Douglas et al. | |
| 7,352,771 | B2 * | 4/2008 | Garber | 370/445 |
| 7,373,154 | B2 | 5/2008 | Sharony et al. | |
| 7,584,048 | B2 * | 9/2009 | Pham et al. | 701/434 |
| 7,626,505 | B2 * | 12/2009 | August et al. | 340/572.4 |
| 7,823,199 | B1 | 10/2010 | Rathi et al. | |
| 7,982,611 | B1 | 7/2011 | Picasso et al. | |
| 8,077,038 | B2 | 12/2011 | Harwell | |
| 8,089,974 | B2 | 1/2012 | Calhoun et al. | |
| 8,237,562 | B1 | 8/2012 | Picasso et al. | |

* cited by examiner

*Primary Examiner* — Vernal Brown
(74) *Attorney, Agent, or Firm* — Brian M. Mancini

(57) ABSTRACT

A method and system for detecting rogue radio frequency based devices includes a plurality of radio frequency based tags disposed at different locations within an area and operable to periodically broadcast information in a beacon, the information including each tag's unique identity information. A map of the area specifies identified radio frequency based tags and their respective locations within the area. A mobile device reads beacons in proximity to the radio frequency based tags and sends location update messages to a server that detects rogue radio frequency based devices within the area based on the location update messages and the map.

17 Claims, 3 Drawing Sheets

DETECTING ROGUE RADIO FREQUENCY BASED TAGS BASED ON LOCATIONING

FIELD OF THE DISCLOSURE

The present invention relates generally to radio frequency based tags and more particularly to detecting rogue radio frequency based tags based on locationing.

BACKGROUND

Locating users inside a building, store, mall, airports, and the like, within a high-level accuracy is a well known problem in the industry. Traditional techniques for locating a wireless communication device within an environment include received signal strength indications (RSSI), time difference of arrival (TDOA), angle of arrival, etc. However, these techniques all suffer from a lack of accuracy, i.e. accuracy is on the order of 60-100 feet. This is not sufficiently accurate for an indoor environment.

Therefore, radio frequency based solutions have been introduced that deploy simply, low-cost radio frequency based tags at known locations within the environment. Such tags can include radio frequency identification (RFID) tags, Bluetooth™ Low Energy (LE) tags, and the like, that periodically broadcast a beacon that includes each tag's unique identity. A client device moving within the environment, and having the ability to receive the beacon and read the identity of any one of such tags, can then be associated with that tag's location. The client device or other network device can provide this identity information to a central server in a location update message, such that the central server will then known the location of the client device.

However, a problem arises from the introduction of radio frequency based tag locationing, in that these simple, low-cost tags do not have much intelligence, and there is no encryption or any authorization involved with their use. As a result, there could be a possibility for hackers to create security attacks for such solutions where client software is running on unmanaged/uncontrolled devices. Such an attack would be primarily to corrupt the central server database of tag identities and locations. For example, an attacker could sniff the packets in the beacons, determine the format of the packet, and determine the deployed tag's identification. All that would be required is for the attacker to walk around the floor and listen for beacons. The attacker could then create a packet with a random list of beacons with known tag identifications, and send these packets in a location update message to the central server. The attacker could use different Media Access Control (MAC) addresses to give an impression that there are multiple clients reporting the location update messages. Further, the attacker could spoof the MAC's from other clients, which could result in more serious issues. In particular, a rogue client using a spoofed MAC address could send the incorrect tag identifications in location update messages so that the location server would think the client is located at a wrong location. Collecting these false location update messages by the central server could result in many false positive readings.

In another scenario, an attacker could broadcast its own beacon and identity (i.e. rogue beaconing). This beacon identity may or may not be known to the central server. In this way, a legitimate client could send an unknown beacon identity to the central server that could not then determine the location of the client device, or a legitimate client could send a known beacon identity to the central server where the server would then determine an incorrect location of the client device.

Hence, there is a need for a technique to detect a rogue device that corrupts radio frequency based locationing within an environment. In particular, it is desirable to provide a technique to detect incorrect location update messages.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
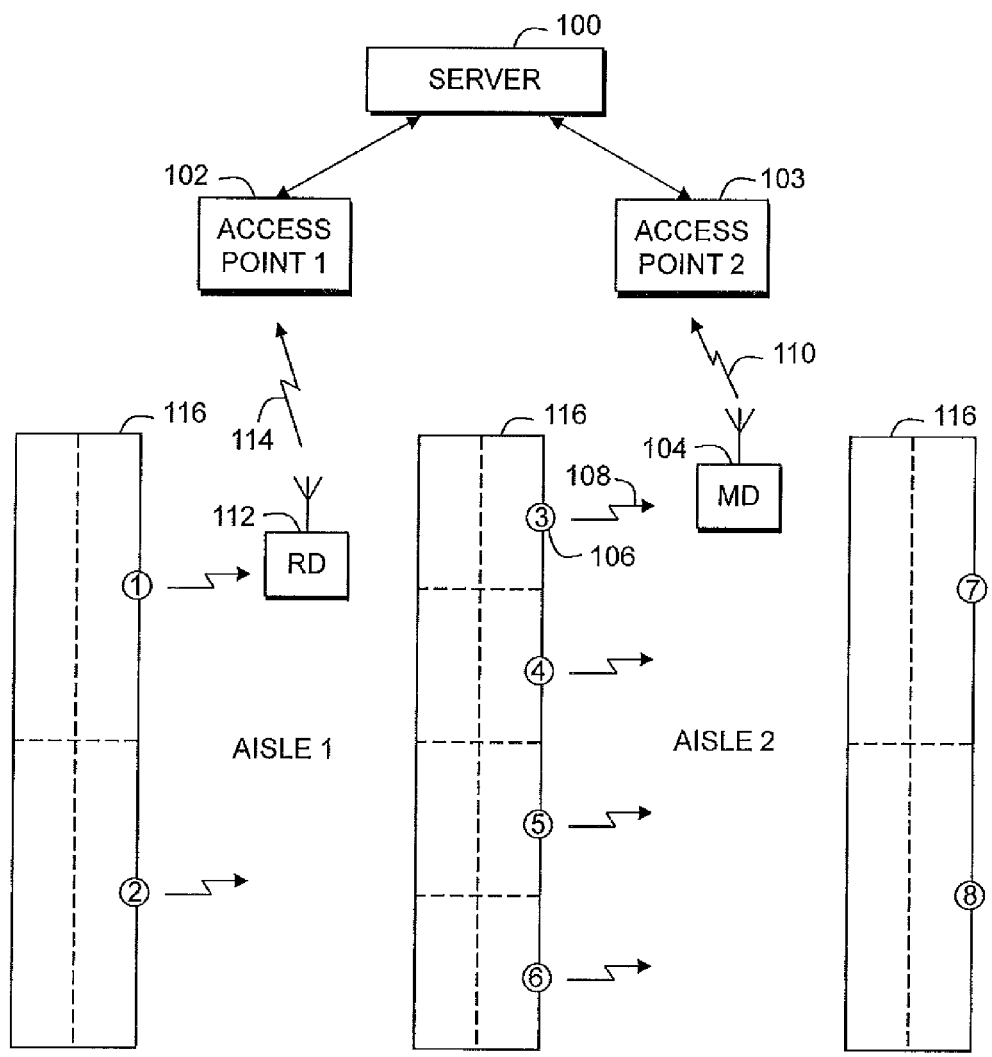
FIG. 1 is a simplified block diagram of a radio frequency based locationing system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique to detect a rogue device that corrupts radio frequency based locationing within an environment. In particular, the present invention provides a technique to detect incorrect location update messages (LUMs).

In an exemplary embodiment, such as shown in FIG. 1, the present invention utilizes radio frequency and associated protocols, such as a radio frequency identification (RFID) or Bluetooth™ Low Energy (LE), for example. The present invention also utilizes other protocols such as IEEE 802.11 (i.e. Wi-Fi).

Those skilled in the art will recognize that FIG. 1 does not depict all of the equipment necessary for system to operate but only those system components and logical entities particularly relevant to the description of embodiments herein. Each of the devices shown in FIG. 1 are known to also comprise basic interconnected components such as, but not limited to, radios, transceivers, antennas, keypads, speakers, microphones, displays, memories, interfaces and processors, such as microprocessors, microcontrollers, digital signal processors, application-specific integrated circuits, field programmable gate arrays, and/or logic circuitry. Such components are typically adapted to implement algorithms and/or protocols that have been expressed using high-level design languages or descriptions, expressed using computer instructions, expressed using messaging logic flow diagrams. Thus, given an algorithm, a logic flow, a messaging/signaling flow, and/or a protocol specification, those skilled in the art are aware of the many design and development techniques available to implement a processor that performs the given logic.

Therefore, each network entity and mobile device represents a known apparatus that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the present invention may be implemented in any of the devices listed above or distributed across such components. It is within the contemplation of the invention that the operating requirements of the present invention can be implemented in firmware or hardware, with the function being implemented in a software processor (or a digital signal processor) being merely a preferred option in conjunction with the firmware or hardware.

Referring to FIG. 1, a system architecture is illustrated with connectivity to a wireless local area network 102, 103 or wired to the Internet, the cloud or any other access network, and operable to provide communications between at least one mobile device 104, and a central/distributed server 100 including a locationing function according to an exemplary embodiment of the present invention. The network can include other entities (not shown) as are known in the art to provide connectivity to multiple mobile devices. N one embodiment, the system is operable within an indoor environment that can include multiple shelving units 116 (three shown in top view), where each shelving unit can have multiple shelf elevations. The present invention is operable to detect rogue devices 112 or rogue tags, e.g. 106 operating in the environment.

In the present invention, a plurality of radio frequency based tags 106 are deploys at mapped locations (eight locations shown in this example) within the indoor environment. In particular, it is envisioned to use small battery-powered, low cost tags that use a wireless technology such as RFID, Bluetooth LE, Wi-Fi, etc. These tags will be placed throughout an environment where locationing is desired. In the example herein, tags are placed on shelving units 116 within a retail environment, such as a store. The tags can be placed at uniform locations on the shelves, i.e. at the same height and at uniform spacing, or can be placed at various elevations at different spacings. It should be understood that in other environments with or without shelving, tags can be placed at any fixed locations. In the example shown, tags are placed more closely in aisle 2 than in aisle 1, to better locate the mobile device 104 therein, for whatever reason the retailer may desire.

When initially installing the tags within the environment, an installer will affix each tag 106 (eight shown) at predetermined locations in the environment, such as by using a map or planogram of the environment. For example, the installer can have a tablet and/or scanning device 112 with a map of locations where tags need to be deployed. The installer can then affix each tag at its proper location according to the map. The installer can then scan a bar code or read a message transmitted by the tag by the scanning device at the physical location of that tag to obtain the identification of the tag, and select the location from the map where that tag was installed, thereby associating the tag to the physical location. An administrator will approve the tags, and only approved tag identities will be stored in the locationing server. The scanning device can be a tablet, radio frequency identification scanner, the mobile device itself, or other scanning device. The actual association can be performed in the tablet and forwarded 114 to the central/distributed server 100, via the local area network/Internet 102, or the location/identity information can be transmitted to the server, which will record the association in a database including a map of locations and associated tag identities. The map can also include an association of the Basic Service Set Identifier of each access point (AP) 102, 103 and the tags being serviced by that AP.

In operation, the radio frequency based tags, such as a Bluetooth LE tags for example, periodically or otherwise transmit their information in a message 108. The message can be transmitted once a second, for example. The information can include one or more of: a unique identity of that tag, its battery status, a sequence number, or other information. The radio frequency based tags are operable to transmit their message at a limited power level, but configured to cover all areas of the environment. In such a configuration, the transmit ranges of neighboring tags that can be received by the mobile device may overlap to some extent. In this way a mobile device could receive a beacon from more than one tag at one time, or more than one tag at separate times within a limited time window, and report these multiple beacons in one location update message. It is also envisioned that the tags are deployed such that a mobile device moving within the environment will always be able to receive a message from at least one tag. For example, tags could successfully be deployed using six-foot spacing with no coverage gaps therebetween.

The message can be received by a mobile device 104 in proximity to at least one of the radio frequency based tags 106, such as when a user of the mobile device walks in front of the tag. The mobile device can be a smartphone including a loyalty application installed therein and operable within the environment to receive the message, or can be a dedicated device mounted on a cart usable within the indoor environment. The mobile device can then read the information in the beacon 108 including the tag identity, and report that information and include its own identity (i.e. Media Access Control or MAC address), to the central/distributed server 100 in a location update message 110 via the network 102, 103 using IEEE 802.11 protocols. The location update message 110 can include information relating to one beacon or can contain information related to the last N sequential tag beacons heard by the mobile device. In this way, the central/distributed location server can associate a location of the mobile device to the mapped location of the radio frequency based tag(s) identified in the received location update message. Since the central/distributed server knows the exact location of each identified tag, it will now know the location of the mobile device user.

These same steps can be repeated once the user moves in front of other tags, such that the mobile device is able to receive other beacons as it moves in proximity to other radio frequency based tags, and the association of the mobile device with these other beacon locations can be used to detect, note, or track a movement of the mobile device.

It is envisioned that within the environment a rogue device 112 such as a rogue mobile device or rogue tag may be introduced maliciously. The rogue device will be a legitimate IEEE 802.11 client as far as IEEE 802.11 protocols are concerned. As such, the rogue device will not violate any state or protocol. However, the rogue device will cause the server to receive incorrect information within the location update messages. Location update messages are genuine application level messages sent using appropriate IEEE 802.11 protocols and packets. However, the information in them will be incorrect. For example, a rogue tag could supply false identity information to a legitimate mobile client, which will forward this false information in a legitimate location update message. In another example, a rogue mobile device can maliciously change correctly read tag information, or generate false information, which is placed in a legitimate location update message that is properly sent to the server. In either event, IEEE 802.11 protocol validation theory cannot be applied in case of rogue client detection, since proper IEEE 802.11 protocols and packets are being used by the rogue device. The present invention detects rogue devices with respect to the higher layer locationing function application, using genuine location update messages with respect to IEEE 802.11. Once the server has the location update messages, it can apply a heuristic approach for determining rogue status. In particular, the present invention performs an analysis of the information in the location update messages with respect to a mobile device's current location, reported tag information, AP coverage area, and other client messages.

To outline the problem of rogue devices, (referring back to FIG. 1) it can be seen that tag 1 and tag 8 are a far distance apart and cannot be read by the same device at the same or sequential times within a narrow time window. Therefore, if a location update message, or sequential location update messages, maliciously generated by a rogue device contains random beacon identities from such distally far apart tags, indicating that a client device is impossibly located in two places at once, it could trigger false positive in the server, indicating a rogue tag. In particular, the server might incorrectly conclude that the tag location is improperly recorded in the map, which would trigger an alarm and create problems for the administrator. In addition, if a location update message contains a spoofed MAC, a legitimate client might see the wrong location, or analytics related to legitimate clients might go wrong. The present invention proposes to follow a heuristic approach for handling above mentioned attacks.

Figure 2:
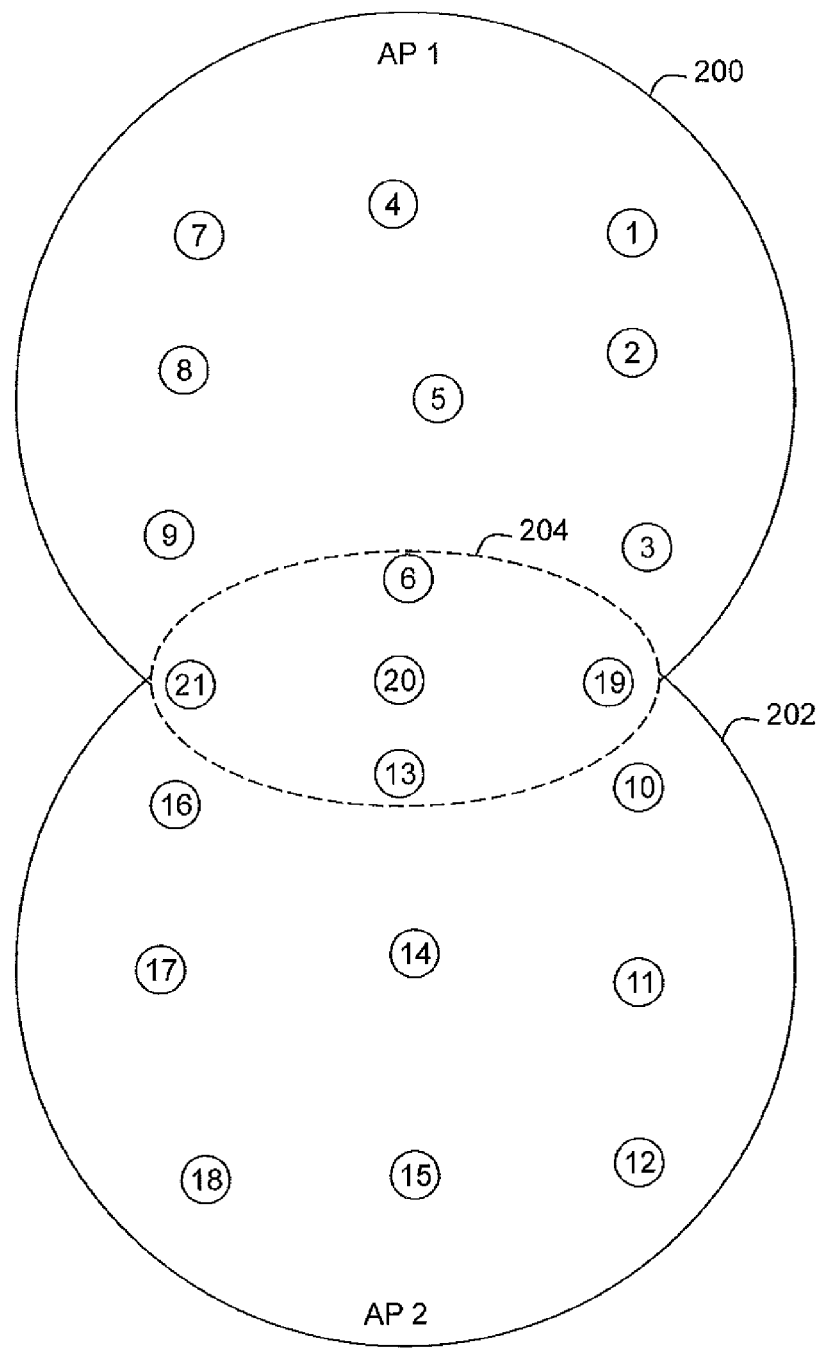
FIG. 2 is a top view of the area showing tags located in different access point service areas, in accordance with some embodiments of the present invention.

FIG. 2, show a map of tags (small circles) within the service coverage areas 200, 202 of two APs in this example. As can be seen, there could be some tags (e.g. 6, 13, 19, 20, 21) in the map which could be covered by multiple APs, due to an overlapped, common coverage area 204. This overlap will be part of site planning for the map, where the server will be able to determine this overlap relationship between the placement of tags and AP coverage areas. In particular, the server could set a coverage area covered by each AP and all the tags falling in that area could be marked as related to that AP. The power and AP model will be criteria for calculating the coverage area and it should be dynamic for changes in transmit power. Each AP knows that it should get location update messages from mobile clients within its coverage area that include the identities of tags within its service area, with the exception of tags in the common coverage area or for those mobile clients associated to the other AP from this AP's coverage area. For example, a client that is present in the common coverage area could send tag IDs in a location update message which belongs to more than one AP's coverage area. Knowing AP coverage areas will reduce the area of attack and will help in identifying the rogue.

Therefore, the present invention provides a system for detecting rogue radio frequency based devices includes a plurality of radio frequency based tags 106 disposed at different locations within an area and operable to periodically broadcast information in a beacon 108, the information including each tag's unique identity information. A map of the area specifies identified radio frequency based tags and their respective locations within the area. A mobile device 104 reads beacons in proximity to the radio frequency based tags and sends location update messages 110 to a server 100 that detects rogue radio frequency based devices 112 within the area based on the location update messages and the map. At least one access point 102, 103 can relay the at least one location update message 110 to the server 100. Each access point is operable to serve a subset area 200, 202 of the map.

In one scenario it is envisioned that the rogue device is a rogue tag that is introduced within the environment and emulated by the rogue device. The rogue tag could be stationary or mobile. The rogue tag can send a beacon using an identity unknown to the server or using an identity known to the server but copied from another legitimate tag. In the case where the rogue tag has an identity unknown to the server, a legitimate client device may read the rogue tag and report the unknown identity to the server, whereupon the server will either assume that its map is wrong or that the client has read a rogue tag since the new identity is not in its map.

For example, there could be a scenario where a legitimate tag is moved from one location to another location but the database map is not get updated. The present invention detects both this outdated database map and a rogue presence using a heuristic approach to differentiate between a rogue tag and outdated records. A key check could be comparing messages from various clients. If many different clients are reporting wrong messages, this can be interpreted as the database map needed updating, but if only few clients are reporting wrong messages and most of the other clients are reported correctly, this can be interpreted as the presence of a rogue tag.

The server can determine the location of rogue tags by first determining the coverage area of the AP reporting the location update message from the client. Then the server can narrow the location using different means, such as: a) noting any subsequent (future) location update message from that same client that includes legitimate beacon identities and associating the position of the rogue tag with that subsequent location, b) using the previously (past) known location of clients who subsequently detect the rogue tag and associating the position of the rogue tag with that previously location, and c) noting if a (present) location update message includes the identity of a legitimate tag along with the new identity of the rogue tag and associating the position of the rogue tag with the legitimate tag. In effect, these techniques utilize past, present, and future determined legitimate locations that are proximal in time to detecting the rogue tag in order to narrow the location of the rogue tag.

In the case where the rogue tag uses a known identity copied from another legitimate beacon, different tests can be performed. For example, if the server is receiving location update messages with the same tag identity, but from different APs, and the identified tag is not mapped to an overlapping, common AP coverage area, then a rogue tag would be suspected within the coverage area of the AP that is not mapped with that tag identity. Narrowing of the location of the rogue tag can then be done using the past, present, and future determined locations test as above. In a different example, if the server is receiving location update messages with the same tag identity, and from the same AP or from the overlapping, common area of two APs, but the location update message includes other tag identities that have not been historically included together with that tag identity (e.g. tags that are not neighbors or do not have signals that can be read together), then a rogue tag can be suspected near those other tag identities. Moreover, if the rogue tag is moving, the location update message can include other tag identities that have not been historically included together with that tag identity, and these other tag identities are changing (such as for the last N update messages), indicating the motion of the rogue tag and its real-time location associated with these other tag identities.

Additionally, the server can compare battery status and/or sequence number of an identified tag. Battery status and sequence number can also be supplied in tag beacons along with tag identity, and can be report by mobile devices in location update messages. If the server detects that the battery status from a legitimate tag identity keeps changing between two different battery levels, this implies that two different tags are reporting the same identity, indicating a rogue tag. In addition, if the server detects that the sequence number (i.e. a counter that needs to be reset once it reaches a predetermined maximum number) is received from a legitimate tag identity becomes out of sequence or invalid, this implies that two different tags are reporting the same identity with different sequences, also indicating a rogue. The server could also check for the reset of sequence number at in improper time or place in the sequence, although this might not be feasible since the fundamental design of tag needs no state to be stored, given the constraints of limited resources and processing power.

In another scenario it is envisioned that the rogue device is a rogue mobile client that is introduced within the environment to generate false location update messages that can include false tag identities and/or false client identities (i.e. MAC address). As before, the rogue mobile client can be registered as a legitimate device in the WLAN system and provide location update messages using legitimate WLAN protocols and packets. As a result, these rogue mobile clients are only detectable by the information they provide to the server in legitimate location update messages. For example, a rogue client device could report an improper combination of tags from different coverage areas, an improper combination of tags from the same coverage area, or an improper combination from the common coverage area 204 or from the common coverage area plus a single coverage area.

For the case where the server receives a location update message reporting an improper combination of tags being reported from different coverage areas, e.g. 2 and 15 are distant from each other and should not be reported together, there could be the following possibilities: a) a legitimate client heard beacons from tags 2 and 15 while it was associated with one AP (AP 2) and has now moved to current AP (AP 1), b) the tag location/identity map is wrong (which the server will already know), or c) the reporting device is a rogue mobile client. There are several actions that the server can take to pin down whether a rogue device is involved. For example, the server can check if the reporting client was associated with the neighbor AP (AP 2) within a time window. If not, it might be a rogue device. The server will keep on tracking this client while it waits for some other (configured number of) clients to provide location update messages, and if these other clients also report the same incorrect combinations of tags (2 and 15) then the location/identity map is wrong. However, if these other clients reports correctly, then the incorrectly reporting tracked client is a rogue client device.

In addition, if the configured number of clients associated to neighbor AP (AP 2) provide location update messages with tag 15, it means that tag 15 is still in neighbors' coverage area. Therefore, if the tracked client reports a further N number of incorrect tag combinations within a predetermined time window, the server can conclude that the tracked device is a rogue client device. The above determinations could be weighted in accordance with empirically determined values to define whether a further investigation should be triggered to clarify whether there actually is a rogue device. These weighted could also include a low rating for any tags located on AP's coverage boundaries, since boundary tags might be reported in multiple AP's coverage areas, and the server might end up having false positives using these boundary tags. Weighting could also be assigned to the last N number of location update messages received by the server within a predetermined time window. For example, a client could be tracked for some duration and once you obtain a good amount of confidence, the weighting algorithm can end and the client can be declared rogue. The length of the time window and/or N can be an empirically configurable value. In one example, if two incorrect messages are reported within a five second window, and the total number of messages reported were four, than this provides a good amount of confidence to declare it as rogue.

For the case where the server receives a location update message reporting an improper combination of tags being reported from the same coverage area, e.g. 2 and 9 are distant from each other and should not be reported together, there could be the following possibilities: a) the tag location/identity map is wrong, or b) the reporting device is a rogue mobile client. There are several actions that the server can take to pin down whether a rogue device is involved. For example, the server can check if the reporting client was associated with the AP (AP 1). If not, this would indicate a rogue client device, but even if true other tests can be performed. In particular, the server will keep tracking this client while it waits for some other (configured number of) clients to provide location update messages, and if these other clients also report the same incorrect combinations of tags (2 and 9) then the location/identity map is wrong. But if these other clients send correct location update messages then the incorrectly reporting tracked client might be a rogue.

In addition, if the tracked client reports a further N number of incorrect tag combination within a predetermined time window, the server can conclude that the tracked device is a rogue client device. The above determinations could be weighted as before.

For the case where the server receives a location update message reporting an improper combination of tags being reported from the common coverage area, e.g. 21 and 19 are distant from each other and should not be reported together, the same reasoning applied for the single coverage area case above.

For the case where the server receives a location update message reporting an improper combination of tags being reported from the common coverage area and a neighbor coverage area, e.g. 16 and 19, there could be the following possibilities: a) a legitimate client heard beacons from tags 16 and 19 while it was associated with one AP (AP 1) and has now moved to current AP (AP 2), b) the tag location/identity map has not been updated properly, or c) the reporting device is a rogue mobile client. There are several actions that the server can take to pin down whether a rogue device is involved, depending on what other legitimate clients are reporting. For example, if a rogue client is associated to one AP and reporting tags from other AP's coverage area, the server can check if the reporting client has reported location update messages with different tags from the common coverage area within last N messages. If not, the reporting device might be rogue, since the probability is low that the reporting device will report only one tag in the common coverage area where it should have reported more different tag combinations, as legitimate clients would do. The server will keep on tracking this client while it checks to see if the tracked client was associated to one of the APs from the commove coverage area in last N messages and waits for some other (configured number of) clients to provide location update messages, and if these other clients also report the same incorrect combinations of tags (16 and 19) then the location/identity map probably need updating. However, if these other clients reports many different combinations, then the tracked client repeatedly reporting the same incorrect combination is probably a rogue client device to be investigated. In addition, if the client reports a further N number of incorrect tag combinations within a predetermined time window, the server could conclude that the tracked device is a rogue client device. The above determinations could be weighted as before.

In all of the above scenarios, the server can perform further common checks to determine the accuracy of the location update message. For example, an authorized client should be reporting sequential location update messages that report tags that create a correct sequential navigation path of neighboring tags, e.g. 4, 5, 6, 20, 13. If the client reports a random navigation path of tags (e.g. 6, 4, 5, 12, 13, 1, 2, 3) or a broken path within a short time window, the server can either ignore these received messages for the last N messages that the navigation path was broken if other clients report the same broken path (indicating an incorrect database map), or assume the client is rogue if other device do not report the same broken path. In another example, an AP can report signal strengths of location update messages it receives to the server. If the AP is receiving location update message having a similar RSSI, but the reported tags are placed at very different distances from the AP (i.e. the server and AP knows the placement of tags so they will know roughly the RSSI the AP should receive if client is located by the reported tag), then the AP or server can drop such messages if other client report the same readings, or keep them in buffer for further validation before committing to them as a rogue if only one device reports these readings. In effect, the server or AP can validate whether the received signal strength for a reported tag is appropriate for that AP and the map location of the reported tag, depending on the number of confirmation readings by other clients.

Figure 3:
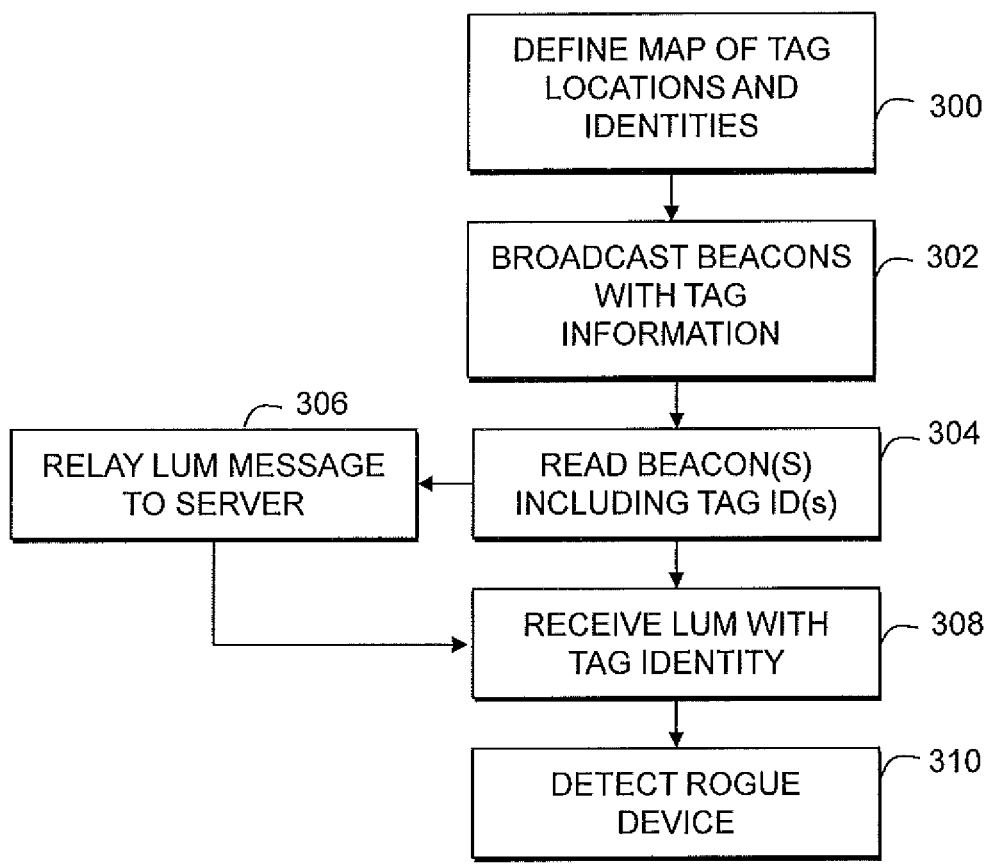
FIG. 3 is a flow diagram of a method, in accordance with some embodiments of the present invention.

FIG. 3 presents a flow chart that illustrates a method for detecting rogue radio frequency based devices, according to an exemplary embodiment of the present invention.

A first step 300 includes defining a map of an area, the map specifying identified radio frequency based tags and their respective locations within the area.

A next step 302 includes periodically broadcasting information in respective beacons from the radio frequency based tags, the information including their unique identity information, respectively.

A next step 304 includes reading at least one beacon by a mobile device in proximity to at least one of the radio frequency based tags, respectively.

A next step 306 includes relaying at least one location update message to an area server, and wherein the detecting step is performed by the server.

A next step 308 includes receiving at least one location update message from the mobile device, the message including identity information in the beacon.

A next step 310 detecting rogue radio frequency based devices within the area based on the at least one location update message and the map.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for detecting rogue radio frequency based devices, comprising:
   a plurality of radio frequency based tags configured to be disposed at different fixed locations within an area and operable to periodically broadcast information in a beacon, the information including each tag's unique identity information, respectively;
   a map of the area, the map for specifying identified radio frequency based tags and their respective locations within the area;
   a mobile device operable to read at least one beacon in proximity to at least one of the radio frequency based tags and send at least one location update message, respectively; and
   a server operable to detect rogue radio frequency based devices within the area based on an incorrect location update message and the map.

2. The system of claim 1, further comprising at least one a plurality if access points operable to relay the at least one location update message in an IEEE 802.11 protocol to the server, wherein each access point is operable to serve a subset coverage area of the map.

3. The system of claim 1, wherein the server is further operable to compare location update messages from various devices heuristically, wherein if few clients are reporting incorrect location update messages and more of the other clients are reported correct location update messages, then the server interprets this as the presence of a rogue device.

4. The system of claim 2, wherein the server is further operable to validate a location update message from a device within a coverage area against location update messages from other devices that are also present in same coverage area, wherein if the information of some devices is not consistent compared to majority of clients in the same coverage area, then the server interprets this as the presence of a rogue device in that coverage area.

5. The system of claim 4, wherein the server validates the comparison for a given time window.

6. The system of claim 2, wherein the server is further operable to receive subsequent location update messages from the mobile device and associate these subsequent location update messages to detect the rogue radio frequency based device, wherein if a further N number of incorrect location update message are detected within a predetermined time window, then the server interprets this as the presence of a rogue device, and wherein location update messages reported from a boundary of a coverage area are weighted lower than location update messages reported from within the coverage area.

7. The system of claim 6, wherein the server is operable to check that the reported tags in the location update messages create a correct sequential navigation path of neighboring tags in their correct locations in accordance with the map.

8. The system of claim 2, wherein the at least one access point is operable to measure a received signal strength indicator of the location update message from the mobile device, and wherein the server is further operable to validate whether the received signal strength for a reported tag is appropriate for that AP and the map location of the tag.

9. The system of claim 1, wherein when at least one sequential location update message includes the identities of at least two tags that should be distal from each other but the at least one sequential location update message shows them next to each other, the server is operable to determine the existence of a rogue device.

10. The system of claim 1, wherein when at least one sequential location update message includes the identities of at least two tags, the server is operable to determine whether these tag identities that have not been historically included together, indicating the existence of a rogue tag.

11. The system of claim 1, wherein the server receiving an unknown tag identity in the location update message indicates the existence of a rogue tag.

12. The system of claim 1, wherein the server receiving a known tag identity, but determining that the tag is in an improper location, indicates the existence of a rogue tag.

13. The system of claim 1, wherein the server is further operable to locate a rogue device using an access point coverage area and a legitimate location of a mobile device proximal in time to detecting the rogue device.

14. The system of claim 1, wherein the information includes a battery status, and wherein the server is further operable to determine if a battery level of an identified tag keeps changing between different battery levels, indicating a rogue tag along with a legitimate tag having the same identity.

15. The system of claim 1, wherein the information includes a sequence number, and wherein the server is further operable to determine if a sequence number of an identified tag becomes out of sequence, indicating a rogue tag.

16. A method for detecting rogue radio frequency based devices, comprising:
   defining a map of an area, the map specifying identified radio frequency based tags and their respective locations within the area;
   the radio frequency based tags periodically broadcasting information in respective beacons, the information including each tags unique identity information, respectively;
   reading at least one beacon by a mobile device in proximity to at least one of the radio frequency based tags, respectively;
   receiving at least one location update message from the mobile device, the message including identity information in the beacon; and
   detecting rogue radio frequency based devices within the area based on an incorrect location update message and the map.

17. The method of claim 16, further comprising the step of relaying the message to an area server, and wherein the detecting step is performed by the server.

* * * * *